United States Patent
Ogasawara

[19]

[11] Patent Number: 6,065,044

[45] Date of Patent: May 16, 2000

[54] HOME PAGE UPDATE NOTIFICATION APPARATUS COMPARING NOTIFICATION TIME AND UPDATE TIME TO DETERMINE HOME PAGE UPDATE STATUS IN AN INFORMATION COMMUNICATION SYSTEM USING COMPUTER NETWORK AND PROGRAM RECORDING MEDIUM

[75] Inventor: Satoshi Ogasawara, Hanno, Japan

[73] Assignee: Casio Computer Co., Ltd., Tokyo, Japan

[21] Appl. No.: 09/041,415

[22] Filed: Mar. 12, 1998

[30] Foreign Application Priority Data

Mar. 17, 1997 [JP] Japan .................................... 9-082450

[51] Int. Cl.[7] ............................. G06F 15/16; G06F 7/00; G06F 17/30; G06F 15/00
[52] U.S. Cl. .......................... 709/207; 709/206; 709/218; 709/219; 707/10; 707/513
[58] Field of Search ................................ 709/218, 206, 709/207, 219; 707/10, 513

[56] References Cited

U.S. PATENT DOCUMENTS

| | | | |
|---|---|---|---|
| 5,247,684 | 9/1993 | Tavares et al. ............................... | 707/8 |
| 5,388,255 | 2/1995 | Pytlik et al. ................................. | 707/4 |
| 5,444,444 | 8/1995 | Ross ...................................... | 340/994 |
| 5,640,513 | 6/1997 | Dauerer et al. .......................... | 709/224 |
| 5,648,770 | 7/1997 | Ross ....................................... | 340/994 |
| 5,692,182 | 11/1997 | Desai et al. ............................... | 707/10 |
| 5,787,470 | 7/1998 | DeSimone et al. ...................... | 711/124 |
| 5,813,007 | 9/1998 | Nielsen ..................................... | 707/10 |
| 5,884,035 | 3/1999 | Butman et al. .......................... | 709/218 |
| 5,898,836 | 4/1999 | Freivald et al. ......................... | 709/218 |
| 5,918,013 | 6/1999 | Mighdoll et al. ........................ | 709/217 |
| 5,923,845 | 7/1999 | Kamiya et al. ....................... | 379/93.15 |
| 5,933,604 | 8/1999 | Inakoshi .................................. | 709/226 |
| 5,933,832 | 8/1999 | Suzuoka et al. ........................ | 707/101 |
| 5,978,828 | 11/1999 | Greer et al. ............................. | 709/2.24 |
| 6,012,087 | 1/2000 | Frievald et al. ......................... | 709/218 |

*Primary Examiner*—Frank J. Asta
*Assistant Examiner*—Paul Kang
*Attorney, Agent, or Firm*—Frishauf, Holtz, Goodman, Langer & Chick, P.C.

[57] ABSTRACT

A home page updating notification apparatus is provided for avoiding useless access operations for accessing the same content of home page several times, so that updated necessary information opened in home pages can be effectively acquired. A home page formed in a home page forming apparatus and then transferred is written into a home page storage portion of a memory, so that updating of this home page is detected. When updating of this home page is detected, a document of an electronic mail, and an address of a transmission destination of this electronic mail are read which have been previously stored. Then, an electronic mail is formed based on the read document and the read address, and the formed electronic mail is transmitted to an address of a transmission destination. As a result, a user of a terminal allocated to this address can be notified by such a fact that the home page is updated by observing the electronic mail.

10 Claims, 5 Drawing Sheets

# HOME PAGE UPDATE NOTIFICATION APPARATUS COMPARING NOTIFICATION TIME AND UPDATE TIME TO DETERMINE HOME PAGE UPDATE STATUS IN AN INFORMATION COMMUNICATION SYSTEM USING COMPUTER NETWORK AND PROGRAM RECORDING MEDIUM

BACKGROUND OF THE INVENTION

1. Field of the Invention

The present invention generally relates to an update notification system for an information communication system using a computer network. More specifically, the present invention is directed to a home-page updating notification apparatus for notifying such information that a content of a home page is updated to a user in the Internet, and is also directed to a program recording medium used in the home-page updating notification apparatus.

2. Description of the Prior Art

Currently, while using home pages on the WWW (World Wide Web) of the Internet, home-page users may widely transmit various sorts of information. In general, the contents of these home-pages are regularly, or irregularly updated.

As to home-page updating occasions, various situations may occur. For instance, in the case that one person accesses the same home page several times so as to gain information thereof, if the content of this home page is irregularly updated, then he necessarily should read the same content of the home page several times. In another case, while a person could not read even once an updated content of one home page, this content is further updated.

Under such a circumstance, conventionally, it is practically difficult to effectively acquire various sorts of information from such home pages, the contents of which are irregularly updated.

SUMMARY OF THE INVENTION

The present invention has been made to solve the above-described problems, and therefor, has an object to provide a home-page updating notification system capable of effectively acquiring information disclosed in a home page by notifying such a message that the content of the home page is updated to a preselected notification destination. As a consequence, this home-page updating notification system can avoid useless access operations to the same content of the home page many times.

Another object of the present invention is to provide a program recording medium capable of recording a home-page updating notification program suitably used in the above-described home-page updating notification system.

To achieve the above-described objects, a home-page updating notification apparatus, according to an aspect of the present invention, is featured by comprising:

home page storage means for storing an externally inputted home page;

update detection means for detecting that the home page stored in the home page storage means is updated; and notification means for notifying such a fact that the home page is updated to a preselected notification destination in response to the detection result of the update detection means.

As a consequence, in accordance with this home-page updating notification apparatus, when updating of the home page is detected by the update detection means, the notification mean notifies such a fact that updating of this home page is updated to a preselected notification destination. In this case, as this preselected notification destination, such a user is selected who has accessed this home page many times, as compared with other users. Accordingly such a waste access operation for accessing the home page having the same content several times can be avoided, so that any users can effectively acquire their necessary information.

BRIEF DESCRIPTION OF THE DRAWINGS

For a more complete understanding of the present invention, reference is made of a detailed description to be read in conjunction with the accompanying drawings, in which.

DETAILED DESCRIPTION OF THE PREFERRED EMBODIMENTS

Referring now to drawings, various preferred embodiments modes of the present invention will be described in detail.

Arrangement of First Home-Page Updating Notification System

Figure 1:
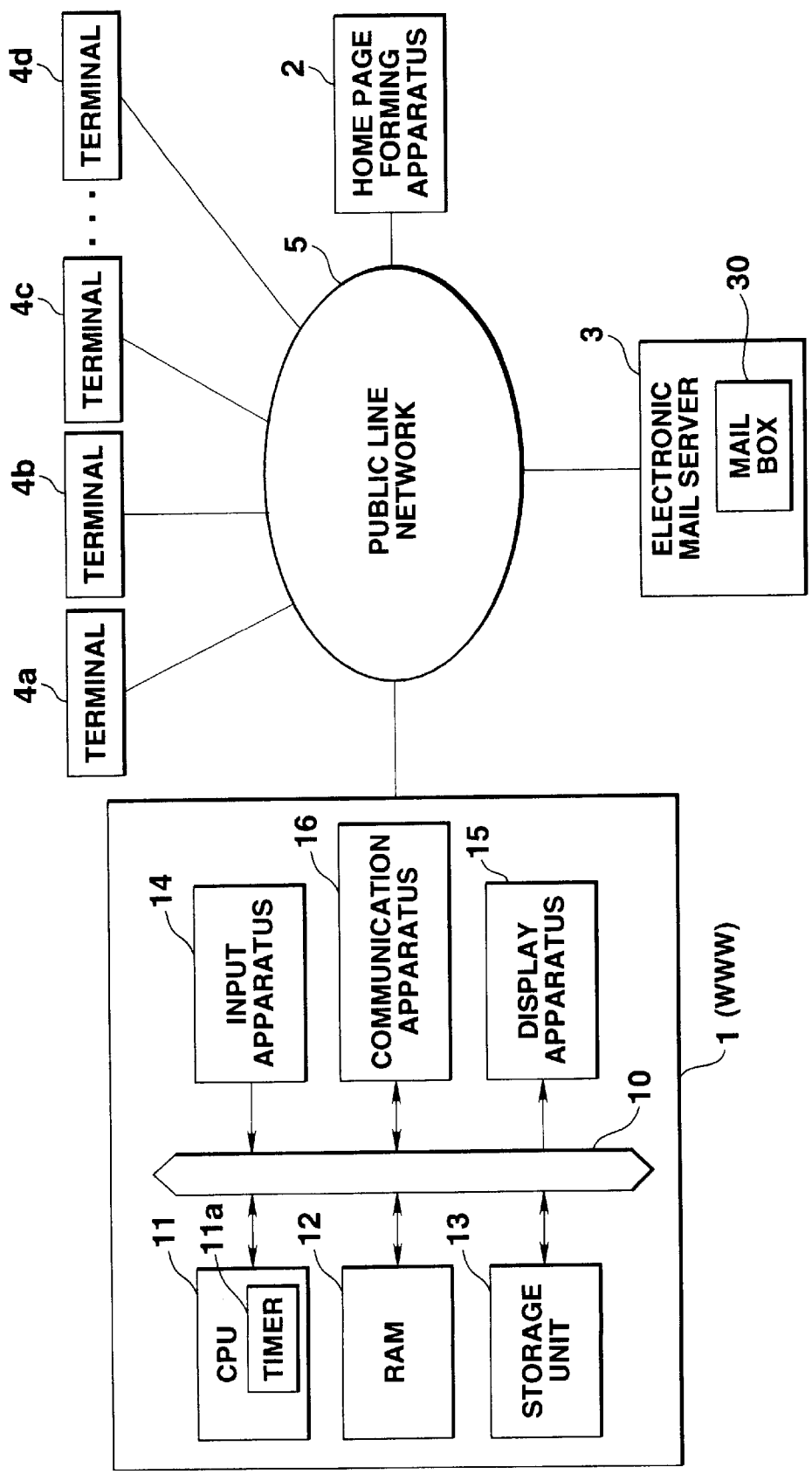
FIG. 1 is a schematic block diagram for representing an arrangement of a home-page updating notification system according to a first preferred embodiment of the present invention.

FIG. 1 is a schematic block diagram for showing an arrangement of a home-page updating notification system according to a first preferred embodiment of the present invention.

As shown in this drawing, this first home-page updating notification system is arranged by a WWW (World Wide Web) server 1, a home page forming apparatus 2, an electronic mail (e-mail) server 3, terminals 4a to 4d, and a public line network 5 for physically connecting these appliances 1 through 4 to each other. Also, the WWW server 1 is logically connected via the public line network 5 to the home page forming apparatus 2. Further, the terminals 4a to 4d are logically connected via the public line network 5 to the electronic mail server 3.

The WWW server 1 is installed in a service provider capable of providing various services, for instance, opening of home pages.

As indicated in FIG. 1, the WWW server 1 is constituted by a CPU (Central Processing Unit) 11, a RAM (Random Access Memory) 12, a storage unit 13, an input apparatus 14, a display apparatus 15, and a communication apparatus 16, which are mutually connected to each other via a bus 10.

The CPU 11 reads out a process program stored in the storage unit 13, and expands the read process program in the RAM 12 so as to execute this process program. Also, this CPU 11 controls operations of the internal structural arrangements of this WWW server 1. The CPU 11 contains a timer 11a for counting present date/time.

The RAM 12 is constructed of a semiconductor memory, and is used as a main storage area. This RAM 12 contains a work memory on which a program code is loaded.

The storage unit 13 is constructed of a recording medium such as a magnetic disk apparatus, and stores the process program used in the CPU 11, and also data. It should be noted that the recording medium of the storage unit 13 involves a fixed type recording medium, and also a detachable type recording medium.

Home Page Table 130

Figure 2:
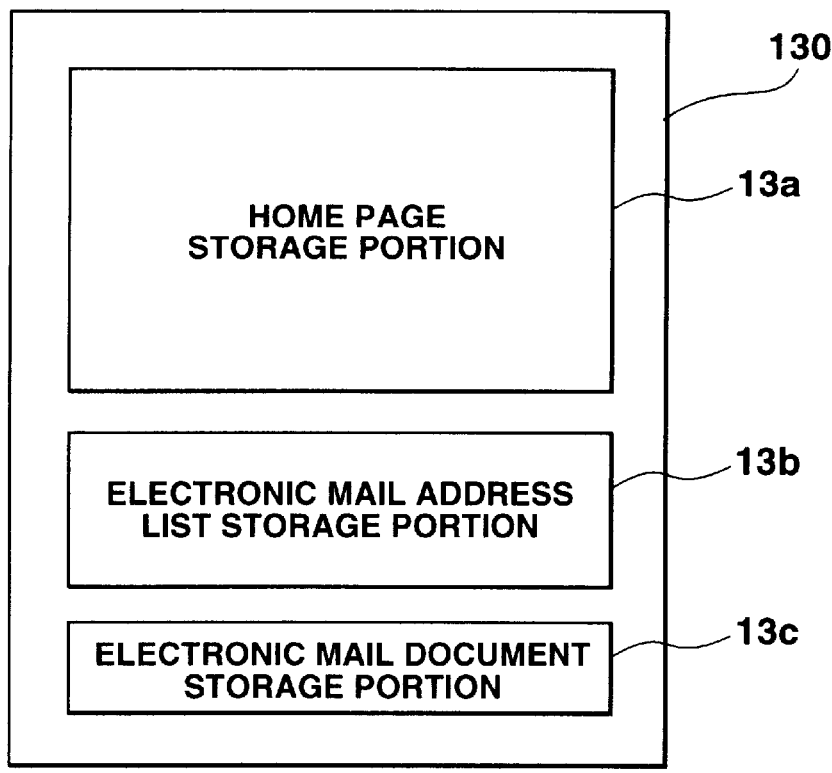
FIG. 2 schematically indicates a memory structure of a storage unit employed in a WWW server of the home-page updating notification system according to the first embodiment.

As indicated in FIG. 2, a home page table 130 is stored in the above-described storage unit 13 every home page stored therein. This home page 130 is constituted by a home page storage portion 13a, an electronic mail address list storage portion 13b, and an electronic mail document storage portion 13c.

The home page storage portion 13a stores such a home page formed by the home page forming apparatus 2 and received via the public line network 5 and the communication apparatus 16 from this home page forming apparatus 2. The information (namely, contents of home pages) stored in the home page storage unit 13a is constructed of image data and text data.

The electronic mail address list storage portion 13b stores a send destination address of an electronic mail, to which updating of a home page is notified (will be discussed later). The addresses are written into this electronic mail address list storage portion 13b, which are notified from users of the terminals 4a to 4d, who want to send electronic mails in accordance with contracts.

Alternatively, any person who wishes to notify updating of a content of a home page is required to write an electronic mail address into this electronic mail address list storage portion 13b. Then, this written mail address may be derived in a form format from this electronic mail address list storage portion 13b, and then the WWW server 1 may acquire this mail address by the CGI (Common Gateway Interface) function.

The electronic mail document storage portion 13c stores a main subject of such an electronic mail used to notify updating of a home page (will be discussed later). For instance, as the main subject of this electronic mail, it is stored "home page of http.//www. has been updated".

Referring back to FIG. 1, the input apparatus 14 is constructed of a keyboard and the like. Commands and data are entered by manipulating this input apparatus 14 by an operator.

The display apparatus 15 is constituted by a CRT (Cathode-ray tube) and the like, and displays a process result made by the CPU 11.

The communication apparatus 16 is equipped with a line terminating apparatus such as a modem. In response to a call issued from a communication apparatus of the home page forming apparatus 2, this communication apparatus 16 controls to connect/disconnect the line between this communication apparatus 16 and the home page forming apparatus 2. Furthermore, in response to an instruction issued from the CPU 11, this communication apparatus 16 controls to connect/disconnect the line between this communication apparatus 16 and the electronic mail server 3. Also, this communication apparatus 16 controls a data transfer between this communication apparatus 16 and either the home page forming apparatus 2 or the electronic mail serve 3. In addition, the communication apparatus 16 controls to connect/disconnect the lines among this communication apparatus 16 and the terminals 4a to 4d in response to accesses made from the terminals 4a to 4d to a home page.

Although not shown in this drawing, the WWW server 1 is connected to another WWW server and the Internet, provided in another service provider.

The home page forming apparatus 2 is constructed of either a personal computer or a work-station, and the like. The home page forming apparatus 2 contains an application software used to form/send a home page. Also, this home page forming apparatus 2 is equipped with a communication apparatus (not shown in detail) for controlling the connection/disconnection between this home page forming apparatus 2 and the WWW server 1, and also for controlling the data transfer between them.

A user of the home page forming apparatus 2 makes a predetermined contract with a service provider where the WWW server 1 is installed, and opens a desirable home page on the WWW server 1.

The electronic mail server 3 is installed in an electronic mail service provider capable of providing an electronic mail service such as NIFTY-serve. The electronic mail server 3 is equipped with a mail box 30 used to store an electronic mail. The mail box 30 contains boxes capable of storing electronic mails with respect to each of addresses allocated to each of the terminals 4a to 4d. The electronic mail server 3 is further equipped with a communication apparatus (not shown in detail) for controlling the connection/disconnection between the WWW server 1, the terminals 4a to 4d, and this electronic mail server 3, and also for controlling the data transfer between them.

The terminals 4a to 4d are arranged by either a personal computer or a portable information terminal, and the like. The terminals 4a to 4d are equipped with communication apparatuses (not shown in detail) for controlling the connections/disconnections between these terminals and the electronic mail server 3, and also for controlling the data transfer between them. The terminals 4a to 4d read out electronic mails stored in mail boxes designated by addresses allocated to the respective terminals.

Similarly, users of these terminals 4a to 4d make up predetermined contracts with the service providers where the WWW server 1 is installed. The terminals 4a to 4d may receive/display the home pages which are formed by the home page forming apparatus 2 and opened in the WWW server 1.

Update Notifying Electronic Mail

In accordance with this first embodiment mode, such a fact that a home page stored in the home page storage unit 13a is updated may be notified to the users of the respective terminals by electronic mails.

Now, a description will be made of this update notifying electronic mail.

Figure 3:
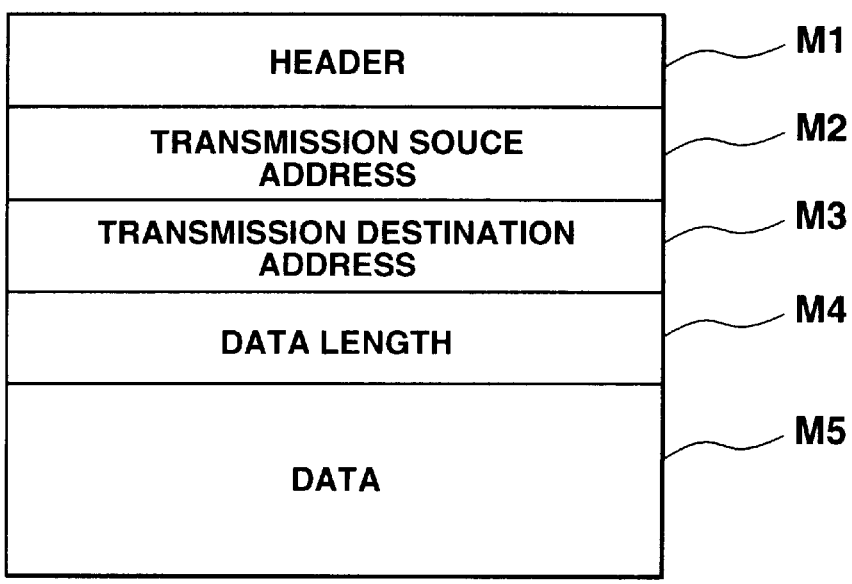
FIG. 3 schematically illustrates an information format of an electronic mail (e-mail)

FIG. 3 schematically represents an information format of this update notifying electronic mail "M".

As indicated in FIG. 3, the update notifying electronic mail "M" is constituted by a header M1, a transmission source address M2, a transmission destination address M3, a data length M4, and data M5.

The header M1 shows information related to this electronic mail M, and contains an information separating code and the like. The transmission source address M2 is an address of an electronic mail allocated to the WWW server 1 corresponding to the transmission source. The transmission address M3 is an address of an electronic mail allocated to each of the terminals 4a to 4d and read from the electronic mail address list storage portion 13b. The data length M4 is data of the data M5 indicated by a byte number thereof. The data M5 enters a main subject of an electronic mail read from the electronic mail document storage portion 13c.

Home-Page Updating Notification by First Home-Page Updating Notification System

Figure 4:
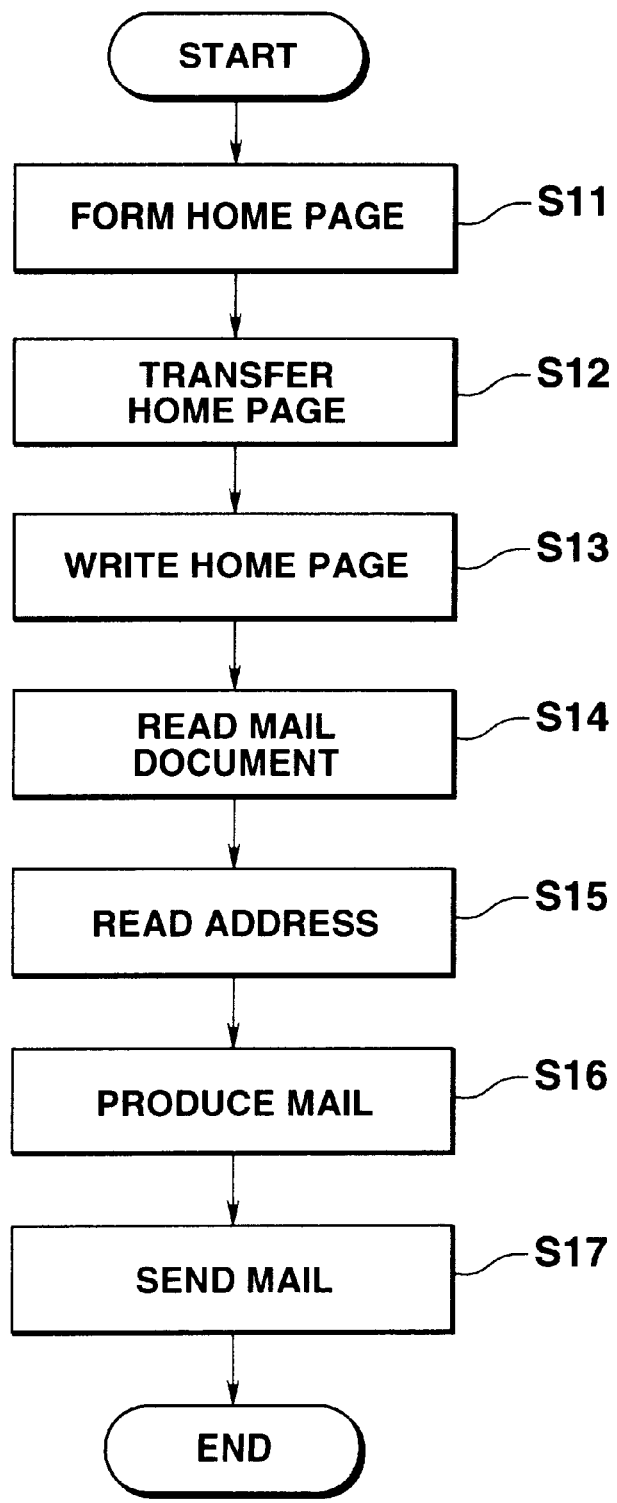
FIG. 4 is a flow chart for describing a process operation for notifying an updating operation of a home page in the first home-page updating notification system.

FIG. 4 is a flow chart for describing a process operation for notifying the home-page updating by the home-page updating notification system according to the first embodiment of the present invention. It should be understood that a program used to execute the respective process operations defined in this flow chart is recorded on the recording medium of the storage unit 13 in the form of the program codes readable by the CPU 11, and the content of this program is loaded on the work memory of the RAM 12.

This home-page updating notification process operation is commenced by that a data link is established between the communication apparatus 16 and the communication apparatus employed in the home page forming apparatus 2 and thus the line is connected between both the communication apparatuses. When the home-page updating notification process operation is commenced, a home page is formed by a user in the home page forming apparatus 2 in accordance with a home-page forming application software (step S11). When the home page is formed, this formed home page is transmitted via the public line network 5 in accordance with a home-page transmitting application software. Then, the transmitted home page is received by the communication apparatus 16 of the WWW server 1 (step S12).

Next, the reception of this home page is notified to the CPU 11, and then the CPU 11 makes up the following judgement: The received home page is written into which home page storage portion 13a among a plurality of these home page tables 130. Then, an instruction is issued to the communication apparatus 16, and this home page is transferred to the judged home page storage portion 13a (step S13). When the transfer operation of the home page is accomplished, an interrupt is demanded from the storage unit 13 to the CPU 11, which may indicate to the CPU 11, such a fact that the home page stored in the home page storage portion 13a is updated. After this interrupt is demanded, this home-page updating notification process operation is advanced to an electronic mail transmission process operation subsequent to a step S14.

The CPU 11 reads a main subject of an electronic mail from the electronic mail document storage portion 13a of the storage unit 13 (step S14). Also, the CPU 11 reads an address of this electronic mail stored in the electronic mail address list storage unit 13b (step S15). Thus, an electronic mail is formed by setting the main subject of the electronic mail read at the step S14 as the date M5, the address read at the step S15 as the transmission source address M3, and further the address allocated to the WWW server 1 as the transmission destination address M2 (step S16).

Next, the CPU 11 instructs the communication apparatus 16 to disconnect the line between the home page forming apparatus 2 and this communication apparatus 16, and also instructs this communication apparatus 16 to connect the line between the electronic mail server 3 and this communication apparatus 16. As a consequence, the communication apparatus 16 connects the line between the electronic mail server 3 and this communication apparatus 16 by controlling the connection between the communication apparatus of the electronic mail server 3 and this communication apparatus 16, so that the electronic mail formed at the previous step S16 is transmitted to a preselected address of the mail box 30 (step S17). Then, this flow chart process operation of FIG. 4 is completed.

It should be understood that when a plurality of addresses are stored in the electronic mail address list storage portion 13b, the process operations defined from the step S14 to the step S17 are repeatedly carried out until all of these plural addresses are ended.

The electronic mail which has been transmitted to a predetermined address of the mail box 30 and stored therein by performing the above-explained process operation may be read out by the users of the terminals 4a to 4d when they want to acquire this electronic mail. Then, since this electronic mail is read to be displayed on the display apparatuses of the terminals 4a to 4d, the users of these terminals 4a to 4d can recognize that the home page is updated.

As previously explained, in accordance with the home-page updating notification system of the first embodiment mode, such a fact that the home page is updated can be notified to the users of the terminals 4a to 4d by the electronic mail.

Arrangement of Second Home-Page Updating Notification System

A home-page updating notification system according to a second preferred embodiment mode of the present invention owns the substantially same arrangement as that of the home-page updating notification system according to the second preferred embodiment mode, shown in FIG. 1.

Figure 5:
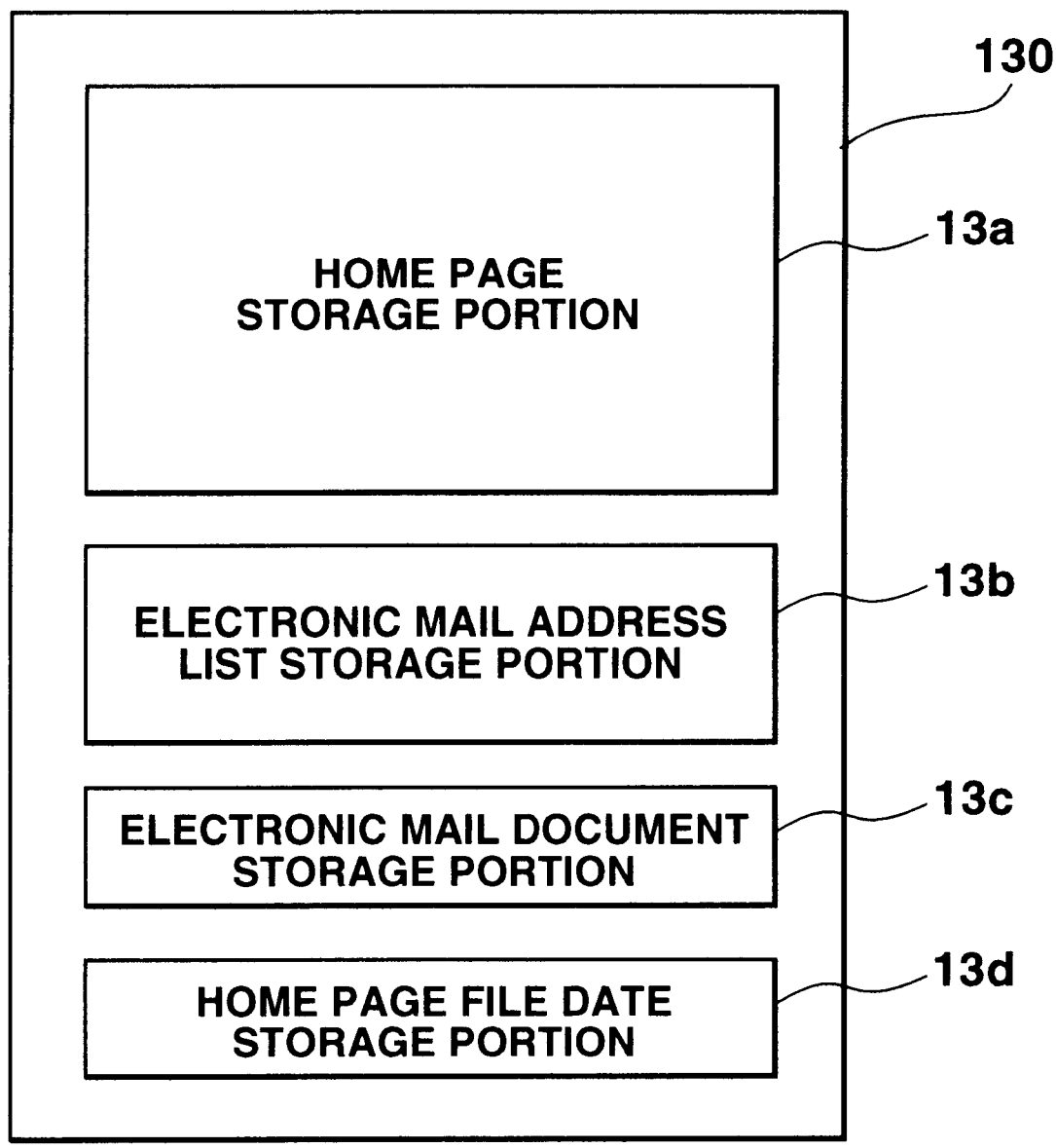
FIG. 5 schematically shows a memory structure of a storage unit employed in a WWW server of a home-page updating notification system according to a second preferred embodiment of the present invention.

However, this second home-page updating notification system owns the following different point. That is, an interrupt is issued from the timer 11a of the CPU 11 to the process operation of this CPU 11 in a preselected time interval, for instance, at 12:00 P.M. every second day. Also, in this second embodiment, as indicated in FIG. 5, a home page file date storage portion 13d provided in the home page table 130. Furthermore, a date when a date of a home page file is updated in a preceding updating operation (will be referred to as a "preceding date" hereinafter) is stored in a preselected area of the RAM 12.

Figure 6:
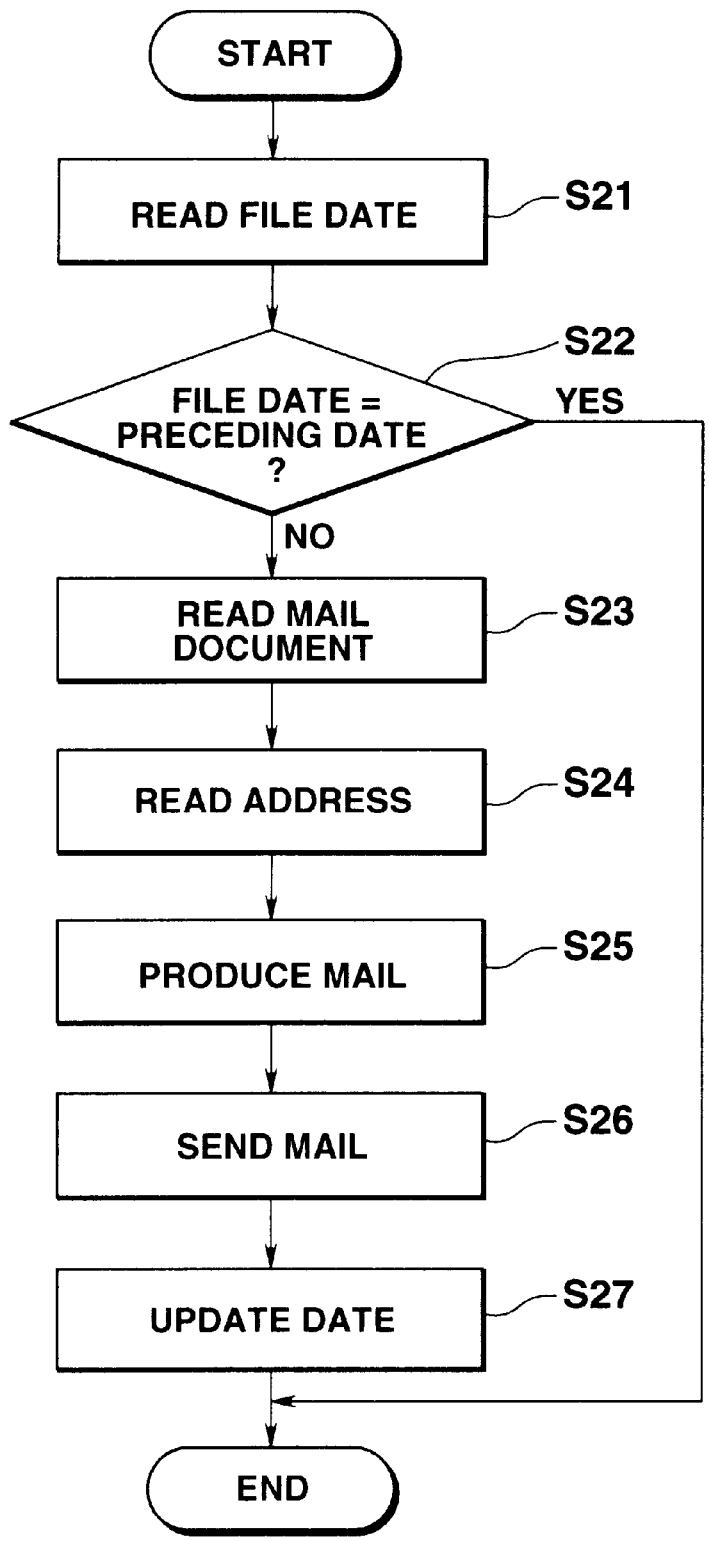
FIG. 6 is a flow chart for describing a process operation for notifying an updating operation of a home page in the second home-page updating notification system.

Home-Page Updating Notification by Second Home-Page Updating Notification System FIG. 6 is a flow chart for describing a process operation for notifying the home-page updating by the home-page updating notification system according to the second embodiment of the present invention. It should be understood that a program used to execute the respective process operations defined in this flow chart is recorded on the recording medium of the storage unit 13 in the form of the program codes readable by the CPU 11, and the content of this program is loaded on the work memory of the RAM 12.

This home-page updating notification process operation of the second embodiment is started by a timer interrupt issued from the timer 11a employed in the CPU 11.

Once this process operation is started, the CPU 11 first reads out a date (will be referred to as a "file date"

hereinafter) stored in the home page file date storage portion 13d of FIG. 5 (step S21). Next, the CPU 11 further reads out the "preceding date" from a predetermined area of the RAM 12 so as to be compared with the "file date" read at the previous step S21 (step S22).

In such a case that the CPU 11 may judge that the "file date" is equal to the "preceding date" at the comparison step S22, the home page stored in the home page storage portion 13a has not yet been updated from the "preceding date". As a result, this second home-page updating notification process operation is ended.

Conversely, when the CPU 11 may judge that the "file date" is not equal to the "preceding date" at the comparison step S22, the home page stored in the home page storage portion 13a has been updated since the preceding date. Thus, the CPU 11 executes the following process operations. That is, a mail document is read out (step S23), an address of a mail is read out (step S24), an electronic mail is formed (step S25), and thereafter this mail is sent (step S26). It should also be noted that the process operations defined from the step S23 to the step S26 are identical to those defined from the step S14 to the step S17 of the flow chart shown in FIG. 4 except that the line between the home page forming apparatus 2 and the CPU 11 is disconnected at the step S26.

In the case that the transmission of the electronic mail is ended at this step S26, the process operation is advanced to a step S27 at which the CPU 11 reads out a date counted by the internal timer 11a thereof. In this case, it is assured that there is no change in the date indicated by the timer 11a while the above-described process operations are executed. Then, the read date is written into a preselected area of the RAM 12 and also the home page file date storage portion 13d. Thereafter, this second home-page updating notification process operation is completed.

It should also be understood that when more than two sets of home page tables 130 are stored in the storage unit 13, a similar process operation may be carried out as to all of the home page tables in the second embodiment.

The electronic mail which has been transmitted to a predetermined address of the mail box 30 and stored therein by performing the above-explained process operation may be read out by the users of the terminals 4a to 4d when they want to acquire this electronic mail. Then, since this electronic mail is read to be displayed on the display apparatuses of the terminals 4a to 4d, the users of these terminals 4a to 4d can recognize that the home page is updated.

As previously explained, in accordance with the home-page updating notification system of the second embodiment mode, such a fact that the home page is updated can be notified to the users of the terminals 4a to 4d by the electronic mail.

Moreover, in accordance with the home-page updating notification system of the second embodiment mode, updating of the home page is detected by the timer interrupt issued from the timer 11a. As a consequence, even when such a detection can be hardly done in that the home page formed by the home page forming apparatus 2 is transferred in accordance with the file transfer protocol and then is written into the home page storage portion 13a, it is easily possible to detect as to whether or not the home page is updated.

Modifications

In the above-explained first embodiment, after the process operation shown in FIG. 4 has been commenced, the home page is formed (step S11). Alternatively, a home page which has been previously formed in the home page forming apparatus 2 may be transferred to the WWW server 1. In other words, the process operation of the flow chart shown in FIG. 4 may be started from the step S12.

Also, in the second embodiment mode, the date when the home page is written into the home page storage portion 13a is stored in the home page file date storage portion 13d, and then the "preceding date" is compared with the "file date" in order to detect as to whether or not the home page is updated. Alternatively, a time instant may be employed as time information in addition to the date in order to judge as to whether or not the home page is updated. Instead of such a time information, a flag capable of changing a condition by writing the home page may be employed. Then, this flag is checked every time a preselected time period has passed in order to detect as to whether or not the home page is updated. In this case, after the electronic mail has been sent, this flag may be reset.

In the above-described first and second embodiment modes, after the electronic mail has been formed from the address stored in the electronic mail address list table 13b and also the main subject of the electronic mail stored in the electronic mail document storage portion 13c (step S16 and S25), the electronic mail is transmitted (steps S17 and S26). Alternatively, the electronic mails may be previously formed with respect to the respective addresses of the terminals to which the electronic mails are transmitted.

Also, in the first and second embodiment modes, the electronic mail server 3 is installed outside the WWW server 1 and is connected to this WWW server 1 via the public line network 5. In other words, the service provider where the WWW server 1 is installed is completely different from the electronic mail service provider where the electronic mail server 3 is installed. Alternatively, the service provider where the WWW server 1 may provide the electronic mail server. In this case, the mail box may be connected to the bus 10 of the WWW server 1.

Further, in the first and second embodiment modes, the users of the terminals 4a to 4b having the addresses with which such an electronic mail indicating that the home page is updated is transmitted make the contracts with the service provider where the WWW server 1 is installed. Alternatively, this electronic mail may be sent via the Internet to another address for a user of a terminal, who has made a contract with another service provider.

Moreover, in the first and second embodiment modes, the electronic mail is used as the means for notifying that the home page is updated. Alternatively, another means may be employed so as to notifying such a fact the home page is updated. For example, a pager of a registered person is individually called, and a facsimile letter is sent to the registered person, so that the registered person may be notified by such a fact that the home page is updated.

What is claimed is:

1. A home page updating notification apparatus comprising:

home page storage means for storing a plurality of home pages;

home page time data storage means for storing update time data produced when one home page among said plurality of stored home pages is updated;

notification time data storage means for storing notification time data produced when updating of said one home page is notified;

a timer for counting time;

comparing means for comparing the update time data stored in said home page time data storage means with the notification time data stored in said notification time data storage means every time a predetermined time counted by said timer means has passed;

update detecting means for detecting that said one home page stored in said home page storage means is newly updated based upon a comparison result produced by said comparing means;

notification means for notifying updating of said one home page to a preselected notification destination in response to said update detecting means detecting that said one home page stored in said home page storage means is newly updated; and notification time data updating means for updating the notification time data stored in said notification time data storage means as the time data produced when updating of said one home page is notified by said notification means.

2. A home page updating notification apparatus as claimed in claim 1, further comprising home page time data updating means for updating the update time data stored in said home page time data storing means as the time data produced when updating of said one home page is notified, and wherein said update detecting means comprises means for detecting that said one home page stored in the home page storage means is newly updated when said update time data stored in said home page time data storage means is not made coincident with said notification time data stored in said notification time data storage means.

3. A home page updating notification apparatus as claimed in claim 1, wherein said comparing means comprises means for comparing the update time data stored in said home page time data storage means with the notification time data stored in said notification time data storing means at a given time measured by said timer every day.

4. A home page updating notification apparatus as claimed in claim 1, wherein said notification means comprises means for storing said predetermined notification destination, and means for notifying said predetermined notification destination that said one home page is newly updated.

5. A home page updating notification apparatus as claimed in claim 1, wherein said predetermined notification destination is a send destination address of an electronic mail, and said notification means comprises means for notifying updating of said one home page by sending said electronic mail to said send destination address.

6. A program recording medium storing thereon a computer readable program used for notifying updating of a home page, said program comprising:

means for causing a computer to store a plurality of home pages;

means for causing the computer to store update time data produced when one home page among said plurality of stored home pages is updated;

means for causing the computer to store notification time data produced when updating of said one home page is notified;

means for causing the computer to count time;

means for causing the computer to compare the stored update time data with the stored notification time data every time a predetermined counted time has passed;

means for causing the computer to detect that said one home page is newly updated based upon a result of the comparison;

means for causing the computer to notify updating of said one home page to a preselected notification destination when it is detected that said one home page is newly updated; and means for causing the computer to update the stored notification time data as the time data produced when updating of said one home page is notified.

7. A program recording medium as claimed in claim 6, wherein said program further comprises means for causing the computer to update the stored update time data when updating of said one home page is notified, and means for causing the computer to detect that said one home page is newly updated when said update time data is not made coincident with said notification time data.

8. A program recording medium as claimed in claim 6, wherein said program further comprises means for causing the computer to compare the update time data with the notification time data at a given time which is measured every day.

9. A program recording medium as claimed in claim 6, wherein said program further comprises means for causing the computer to store said predetermined notification destination, and means for causing the computer to notify said predetermined notification destination that said one home page is newly updated.

10. A program recording medium as claimed in claim 6, wherein said program further comprises means for causing the computer to store a send destination address of an electronic mail as said predetermined notification destination, and means for causing the computer to notify updating of said one home page by sending an electronic mail to said send destination address.

* * * * *